W. KYLLONEN.
TRACE ATTACHING DEVICE.
APPLICATION FILED MAR. 26, 1914.
1,105,331.
Patented July 28, 1914.
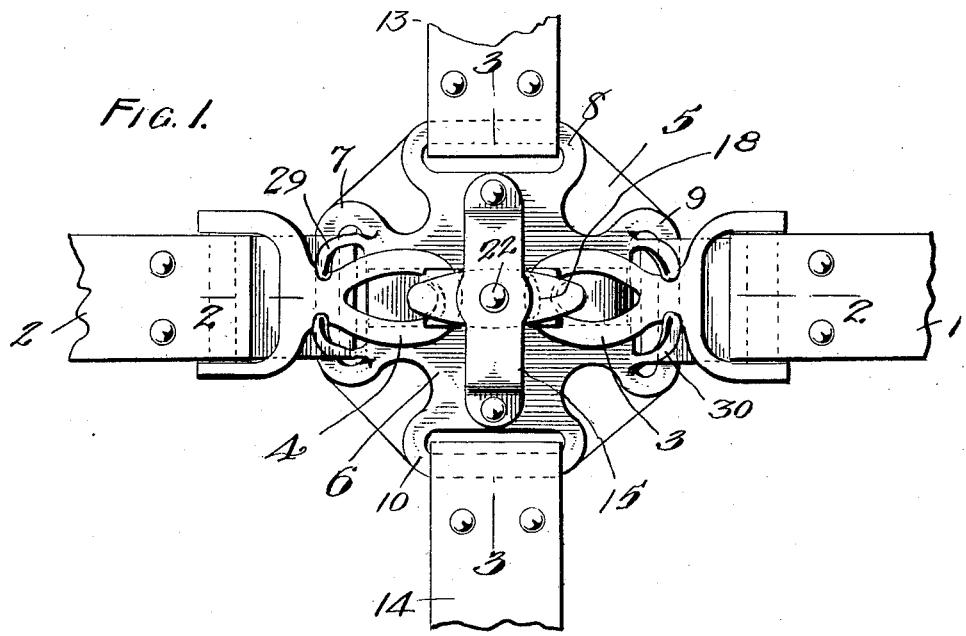
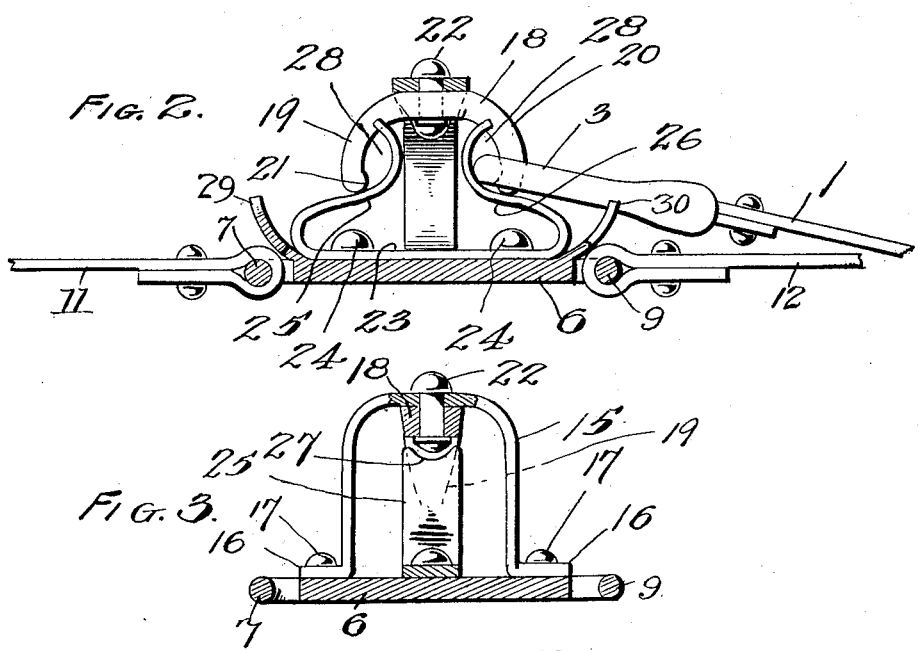
WITNESSES.
A. P. Heougham
E. S. Simmons
INVENTOR
WILLIAM KYLLONEN
By Chas. K. Davis
Attorney

UNITED STATES PATENT OFFICE.

WILLIAM KYLLONEN, OF OAKES, NORTH DAKOTA.

TRACE-ATTACHING DEVICE.

1,105,331. Specification of Letters Patent. Patented July 28, 1914.

Application filed March 26, 1914. Serial No. 827,296.

*To all whom it may concern:*

Be it known that I, WILLIAM KYLLONEN, a citizen of the United States, residing at Oakes, in the county of Dickey and State of North Dakota, have invented certain new and useful Improvements in Trace-Attaching Devices, of which the following is a specification.

The present invention relates to improvements in trace attaching devices, and is designed to be used as a part of a horse harness for attaching the eyes or tugs of traces when hitching or unhitching a horse.

The primary object of the invention is the provision of a simple but effective device upon which the trace ends may be hung for convenience, and which is comparatively inexpensive in production, and not likely to become deranged or broken in use.

The invention consists in certain novel combinations and arrangements of parts as will be hereinafter set forth and claimed.

In the accompanying drawings I have illustrated one complete example of the physical embodiment of my invention constructed according to the best mode I have so far devised for the practical application of the principles of the invention, but it will of course be understood that the invention may be embodied in other forms if desired without departing from the spirit of my claims.

Figure 1 is a plan view of the device embodying my invention. Fig. 2 is a vertical sectional view on line 2—2 Fig. 1, and Fig. 3 is a vertical sectional view on line 3—3 of Fig. 1.

In the preferred embodiment of my invention as illustrated in the drawings I have shown the two trace ends or tugs attached to the device as in actual use, the traces being indicated by the numerals 1 and 2 and their eyes by the numerals 3 and 4 respectively. Figs. 1 and 2 give a comprehensive understanding of the device and its use.

In most cases I employ a leather or other pad 5 to which the base plate 6 may be attached in any suitable manner, and the base plate forms the support or foundation of the attachment. The base plate is provided with diametrically arranged loops or eyes 7, 8, 9, 10, which are preferably integral with and designed for attachment of the two hip straps 11 and 12 and the back strap 13 and tail strap 14 for the crupper. These straps are indicated in their proper places in Figs. 1 and 2 to give a clear understanding of the device, but it will be understood of course that they do not form the essential feature of my invention, although actually necessary for a complete combination of the elements.

The trace supporting attachment is supported from the base plate by means of the yoke or arch 15 which has its ends 16 riveted at 17 to the base plate, and when the attachment is in position as a part of the harness this arch plate or yoke extends parallel with the length of the horse's back, it being understood of course that the device is located as usual on the horse's rump.

The arch plate 15 is designed to support a transversely arranged arm 18 formed with integral downwardly extending prongs 19 and 20 each of which is formed with a head 21 extending inwardly and toward each other. The arm is rigidly secured to the arch plate by means of a rivet 22 passed through both members which are perforated for the purpose and the rivet is located centrally of both the plate and arm. Below the arm and lying in the same parallel plane is a metallic plate 23 secured to the base plate by rivets 24. Each end of the plate 23 is formed with a compound curved portion 25, 26, and the extremes of these curved portions are cut out as at 27 to fit snugly about the inner sides of the arms 19 and 20 of the transverse arm 18. It will be understood of course that the portions of the plate are resilient and their resiliency holds them in contact with the ends 21 of the prongs and also causes the ends of the spring portions 25 and 26 to partially embrace the inner sides of the prongs at the cut away portions 27. In this manner the curved ends of the spring plate are constantly held in contact with the ends and inner sides of the prongs to form a space 28 therebetween. This space is for the reception of the tugs. The tugs or eyes of the traces are snapped into place by bearing down upon the spring as 26 in Fig. 2, and as the spring end is pressed down the tug or eye is pushed under the end 21 of the arm 20 and the spring when released, by its resiliency returns to position shown in Fig. 2 and the eye is held in the space 28 as shown. Because of the construction of the head 21 of each arm 19 and 20, it will be seen that the eye is held, not by the spring, but by the head of the arm which receives the load or tug and the spring acts as a guide or retainer for the eye. In this manner the trace end is held against displacement and consequent annoyance to an attendant when hitching or unhitching a horse. The tug or trace end may be further retained against swinging by means of the pair of spurs or curved hooks 29 and 30, one pair at each side of the device, and these hooks are formed in order that they may partially clasp the throat or reduced portion of the eyes 3 as seen clearly in Figs. 1 and 2. When it is desired to disengage the eye from its retainer it is not pulled directly from the arm 20, but is given a twist or partial turn and this movement of the eye depresses the spring end and the eye is withdrawn from the curved arm with facility and ease.

Having thus fully described my invention, what I claim as new and desire to secure by Letters Patent is:—

1. In a harness the combination with a base plate and an arch plate rising therefrom, a pair of integral inwardly curved arms secured beneath the arch plate, and a plate secured to the base plate under the arms having resilient ends formed with cut away portions to engage said arms and provide a retaining space under each arm.

2. In a harness the combination with a base plate and an arch plate rising therefrom, of a pair of integral arms secured to the arch plate and extending inwardly and downwardly therefrom, a head at the end of each arm and a plate secured under said arms having resilient ends formed on compound curves and engaging the arms, and means on the base plate to partially encircle and retain a tug, as described.

In testimony whereof I affix my signature in presence of two witnesses.

WILLIAM KYLLONEN.

Witnesses:
J. A. McKee,
W. M. Lodá.